United States Patent
Yamada et al.

(10) Patent No.: US 8,480,102 B2
(45) Date of Patent: Jul. 9, 2013

(54) LOWER VEHICLE-BODY STRUCTURE OF VEHICLE

(75) Inventors: Ken Yamada, Hiroshima (JP); Kazuki Yamauchi, Hiroshima (JP); Hiroaki Takeshita, Hiroshima (JP); Masanobu Fukushima, Hiroshima (JP)

(73) Assignee: Mazda Motor Corporation (JP)

( * ) Notice: Subject to any disclaimer, the term of this patent is extended or adjusted under 35 U.S.C. 154(b) by 102 days.

(21) Appl. No.: 13/162,258

(22) Filed: Jun. 16, 2011

(65) Prior Publication Data

US 2011/0316295 A1    Dec. 29, 2011

(30) Foreign Application Priority Data

Jun. 28, 2010 (JP) ................................ 2010-146123

(51) Int. Cl.
*B62D 21/11* (2006.01)
*B62D 21/15* (2006.01)

(52) U.S. Cl.
USPC ............... 280/124.109; 180/311; 280/784; 296/187.09; 296/193.09

(58) Field of Classification Search
USPC ............... 180/274, 311, 312; 280/124.109, 280/124.134, 784; 296/187.09, 187.1, 193.09, 296/204, 203.02
See application file for complete search history.

(56) References Cited

U.S. PATENT DOCUMENTS

| | | | | |
|---|---|---|---|---|
| 5,611,569 A * | 3/1997 | Sekiguchi et al. | ............ | 280/788 |
| 6,109,629 A * | 8/2000 | Bortz et al. | ............ | 280/124.109 |
| 6,193,274 B1 * | 2/2001 | Brown et al. | ................. | 280/784 |
| 6,679,523 B2 * | 1/2004 | Yamamoto et al. | ............ | 280/785 |
| 6,705,627 B2 * | 3/2004 | Hasebe et al. | ......... | 280/124.134 |
| 7,032,701 B2 * | 4/2006 | Yoshida et al. | ................. | 180/291 |
| 7,213,873 B2 * | 5/2007 | Murata et al. | ................. | 296/204 |
| 7,654,543 B2 * | 2/2010 | Tanaka et al. | ......... | 280/124.109 |
| 7,665,751 B2 * | 2/2010 | Kunert et al. | .......... | 280/124.134 |
| 7,726,672 B2 * | 6/2010 | Yamagishi et al. | .... | 280/124.109 |
| 7,883,113 B2 * | 2/2011 | Yatsuda | ........................ | 280/784 |
| 8,201,875 B2 * | 6/2012 | Baccouche et al. | ........... | 296/204 |
| 8,267,429 B2 * | 9/2012 | Takeshita et al. | ................. | 280/784 |
| 2011/0095568 A1 * | 4/2011 | Terada et al. | ............ | 296/187.09 |
| 2011/0198889 A1 * | 8/2011 | Takeshita et al. | ........ | 296/203.02 |

FOREIGN PATENT DOCUMENTS

DE    3800944 C1 *  1/1989
JP    2004-148960 A   5/2004

* cited by examiner

*Primary Examiner* — Joseph Rocca
*Assistant Examiner* — Laura Freedman
(74) *Attorney, Agent, or Firm* — Studebaker & Brackett PC (57) ABSTRACT

In a lower vehicle-body structure of a vehicle, there is provided a rear connecting member swingably supporting a rear portion of a lower arm at a sub frame and a front side frame, the rear connecting member comprising a support portion to support the lower arm, a fifth connection portion to connect the sub frame and the support portion, and a fourth connection portion to connect the front side frame and the support portion. Further, there is provided a separation mechanism to separate the fourth connection portion off the front side frame in the vehicle frontal collision. Accordingly, the sub frame and the lower arm are separated off the front side frame by the separation mechanism.

14 Claims, 7 Drawing Sheets

LOWER VEHICLE-BODY STRUCTURE OF VEHICLE

BACKGROUND OF THE INVENTION

The present invention relates to a lower vehicle-body structure of a vehicle, in which arm members constituting a suspension are supported at a sub frame at a front portion of a vehicle body of an automotive vehicle, for example.

Conventionally, a lower vehicle-body structure of a vehicle, in which a crush space to absorb a collision impact in a vehicle frontal collision is provided at a front portion of a vehicle body, is known. Specifically, this kind of lower vehicle-body structure comprises a pair of front side frames extending in a longitudinal direction at both sides of the front portion of the vehicle body. The front side frames are configured to easily have a buckling deformation receiving an impact load caused by the vehicle frontal collision, so that the collision impact in the vehicle frontal collision can be absorbed properly. The crush space is a space to absorb the collision impact though the buckling deformation of the front side frames. Thus, ensuring the crush space to absorb the collision impact sufficiently can prevent the impact load from being transmitted to a vehicle rear.

In the above-described structure, a power train, such as engine, and the sub frame comprising a suspension cross member are arranged in the above-described crush space. The suspension cross member supports a suspension member which is arranged right below or in back of the power train. Further, the power train and the sub frame are supported or fixed to interconnect both sides of the crush space in a vehicle width direction.

Since the power train and the like interconnect both sides of the crush space in the vehicle width direction as described above, the front side frames may be restrained from deforming in the vehicle width direction against the impact load from the vehicle front, so that the sufficient buckling deformation may not be obtained. Thereby, there is a concern that the crush space to absorb the collision impact sufficiently may not be secured.

Therefore, some technologies to secure the crush space by separating the power train or the sub frame off the vehicle body in the vehicle frontal collision have been proposed.

Specifically, some weak portion is provided at a connection portion of the sub frame to the vehicle body, and the sub frame is separated off the vehicle body by this weak portion in the vehicle frontal collision, so that the crush space to absorb the collision impact sufficiently can be secured (see Japanese Patent Laid-Open Publication No. 2004-148960).

Meanwhile, a structure in which arm members constituting the suspension, such as lower arms, are swingably supported at the sub frame is known as one of the lower vehicle-body structures at the front portion of the vehicle body.

In this kind of structure, it may be considered, in order to provide effects of reducing the road noise during the vehicle traveling, that the attachment rigidity of the support portion at the rear portion of the arm members is improved by supporting rear portions of the arm members at both the sub frame and the front side frames.

However, there is a concern that this supporting of the rear portions of the arm members at both the sub frame and the front side frames may prevent a smooth separation of the sub frame together with the arm members in the vehicle frontal collision. Thus, there may be a possibility that the crush space to absorb the collision impact sufficiently is not secured.

SUMMARY OF THE INVENTION

The present invention has been devised in view of the above-described matters, and an object of the present invention is to provide a lower vehicle-body structure of a vehicle which can secure the crush space to sufficiently absorb the collision impact in the vehicle frontal collision, improving the attachment rigidity of the support portion at the arm members.

According to the present invention, there is provided a lower vehicle-body structure of a vehicle, comprising a pair of front side frames extending in a longitudinal direction at both sides of a front portion of a vehicle body, a sub frame arranged between the front side frames and supporting a suspension member, a pair of arm members constituting part of the suspension member, a front connecting member swingably supporting a front portion of the arm member at the sub frame, a rear connecting member swingably supporting a rear portion of the arm member at the sub frame and the front side frame, the rear connecting member comprising a support portion to support the arm member, a first connection portion to connect a connected portion of the sub frame and the support portion, and a second connection portion to connect a connected portion of the front side frame and the support portion, and a separation mechanism to separate the second connection portion of the rear connecting member off the front side frame by an impact load from a vehicle front in a vehicle frontal collision.

Herein, the above-described arm member is one of plural arm members constituting a vehicle suspension, which is located in a lower position and connects a wheel side and the sub frame. This arm member may be a lower arm of a strut type of suspension, for example. Further, the above-described vehicle frontal collision may be a vehicle collision in which a vehicle collides at its entire front face or part of its front face (i.e., an offset collision).

According to the present invention, the attachment rigidity of the support portion at the arm member can be improved, and the crush space to sufficiently absorb the collision impact in the vehicle frontal collision can be secured. That is, connecting the arm member of the suspension to both the sub frame and the front side frame via the rear connecting member can increase the attachment rigidity of the support portion at the rear portion of the arm member. Accordingly, the road noise which may generate during the vehicle traveling is reduced, so that conformability of passengers can be improved. Moreover, separating the sub frame off the front side frame together with the arm member in the vehicle frontal collision can secure the crush space at the front portion of the vehicle body. Accordingly, the collision impact in the vehicle frontal collision can be absorbed sufficiently.

According to an embodiment of the present invention, the second connection portion of the rear connecting member is fastened to the connected portion of the front side frame via a fastening member, and the separation mechanism comprises a separation promotion portion to promote a downward separation of the fastening member off the connected portion of the front side frame by the impact load from the vehicle front in the vehicle frontal collision. Herein, it may be preferable that the above-described separation promotion portion of the separation mechanism comprises a slot-shaped opening portion which is formed at the connected portion of the front side frame to assist the downward separation of the fastening member off the connected portion of the front side frame. Thereby, some downward force to separate the sub frame off the front side frame acts on the slot-shaped opening portion in the vehicle frontal collision, so that the second connection portion can be easily separated off the front side frame.

According to another embodiment of the present invention, the sub frame comprises a suspension cross member extending in a vehicle width direction and supporting the arm members and a pair of longitudinal members extending in the longitudinal direction below the front side frames and attached to a front portion of the suspension cross member. Thereby, part of the collision impact generating in the vehicle frontal collision is absorbed through the buckling deformation of the longitudinal member, so that the collision impact which may be transmitted to the suspension cross member can be reduced. Further, the suspension cross member can be separated off the vehicle body by the collision impact reduced by the buckling deformation of the longitudinal member. Accordingly, the crush space can be secured, and thereby the collision impact from the vehicle front can be absorbed sufficiently.

According to another embodiment of the present invention, a resilient member resiliently supporting the arm member is provided at the support portion of the rear connecting member. Herein, the resilient member may be made from a resilient material, such as rubber bush. Thereby, in case the sub frame is rigidly fixed to the front side frame, for example, the resilient member can reduce the road noise which may be transmitted via the arm member. Accordingly, any resilient member, such as a rubber bush, may be eliminated in fixing the sub frame to the front side frame, so that the number of parts or assembling steps may be decreased. Thereby, the costs reduction and the weight reduction can be obtained.

According to another embodiment of the present invention, the separation mechanism constitutes a first separation mechanism, and a second separation mechanism is further provided, the second separation mechanism being configured to separate a third connection portion which supports a rear end portion of the sub frame at the vehicle body off the vehicle body by an impact load from the vehicle front in the vehicle frontal collision. Thereby, the rear end of the sub frame is connected to the vehicle body, so that the support rigidity of the sub frame can be improved and the sub frame can be easily separated off the vehicle body in the vehicle frontal collision.

According to another embodiment of the present invention, the second separation mechanism comprises a deformation promotion portion provided between the connected portion of the sub frame and the third connection portion. Herein, the deformation promotion portion may be comprised of a bead which is formed on a one-side face of the sub frame or plates which have different thickness and are combined together. Thereby, the buckling deformation of the sub frame is promoted in the vehicle frontal collision, and the impact load from the vehicle front is transferred to the downward force through the bucking deformation, so that the third connection portion can be separated off the vehicle body. Further, some downward force to separate the sub frame off the front side frame is made act on the second connection portion by the separation of the third connection portion, so that the second connection portion can be separated off the front side frame. Accordingly, the buckling deformation of the sub frame is caused, so that the impact load is transferred to some force to separate the sub frame, and thereby the sub frame can be easily separated.

Other features, aspects, and advantages of the present invention will become apparent from the following description which refers to the accompanying drawings.

DETAILED DESCRIPTION OF THE INVENTION

Figure 1:
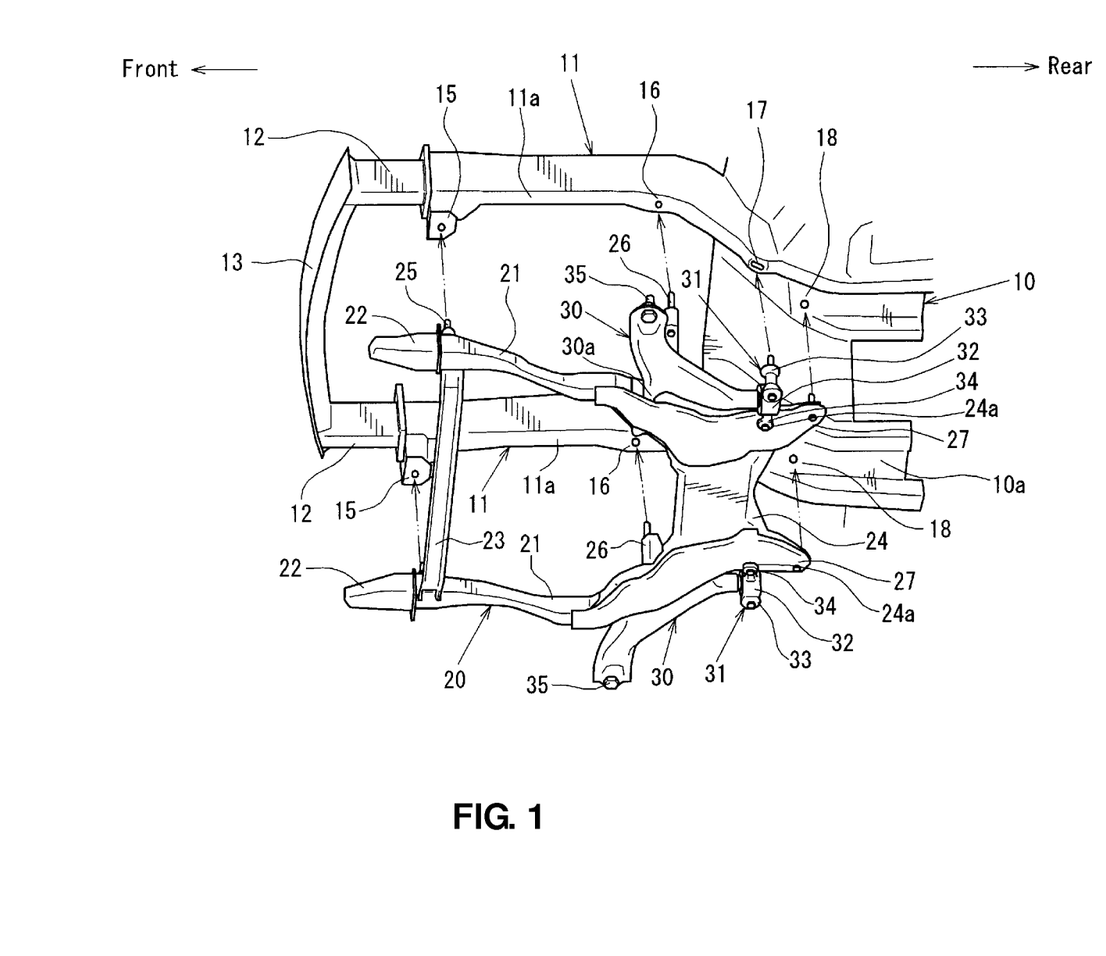
FIG. 1 is a perspective view showing a lower vehicle-body structure of a front portion of a vehicle body, when viewed from its bottom face.
Figure 2:
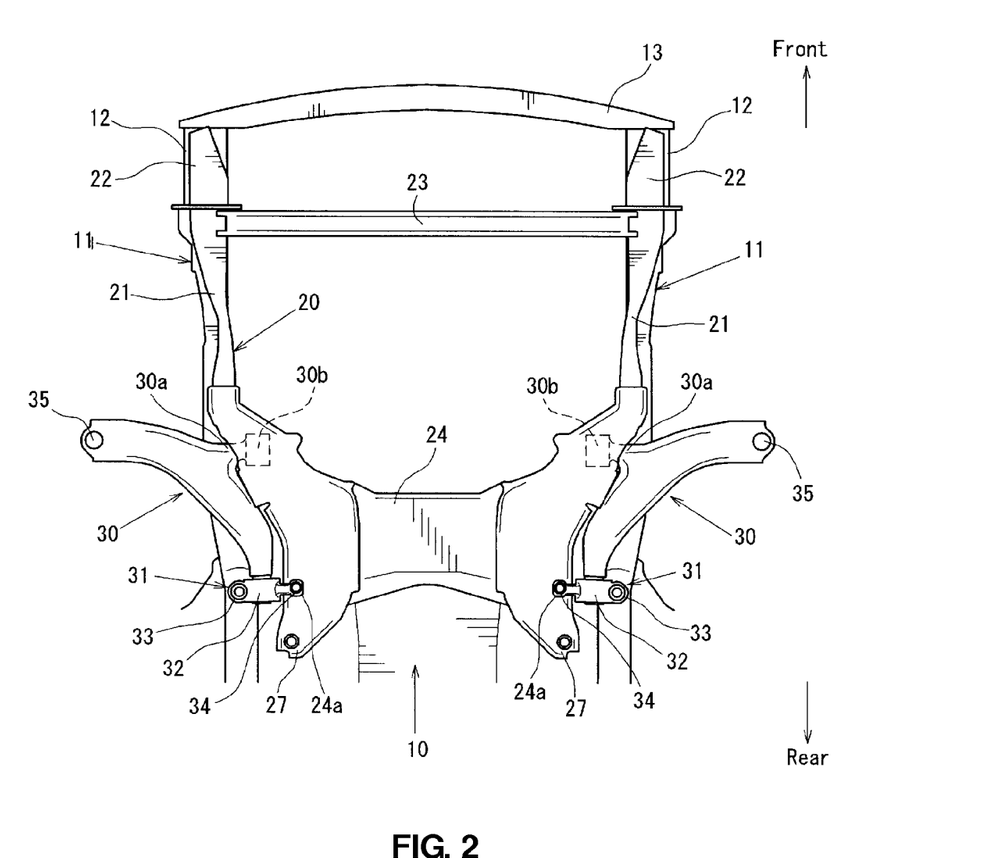
FIG. 2 is a bottom view showing the lower vehicle-body structure of the front portion of the vehicle body.
Figure 3:
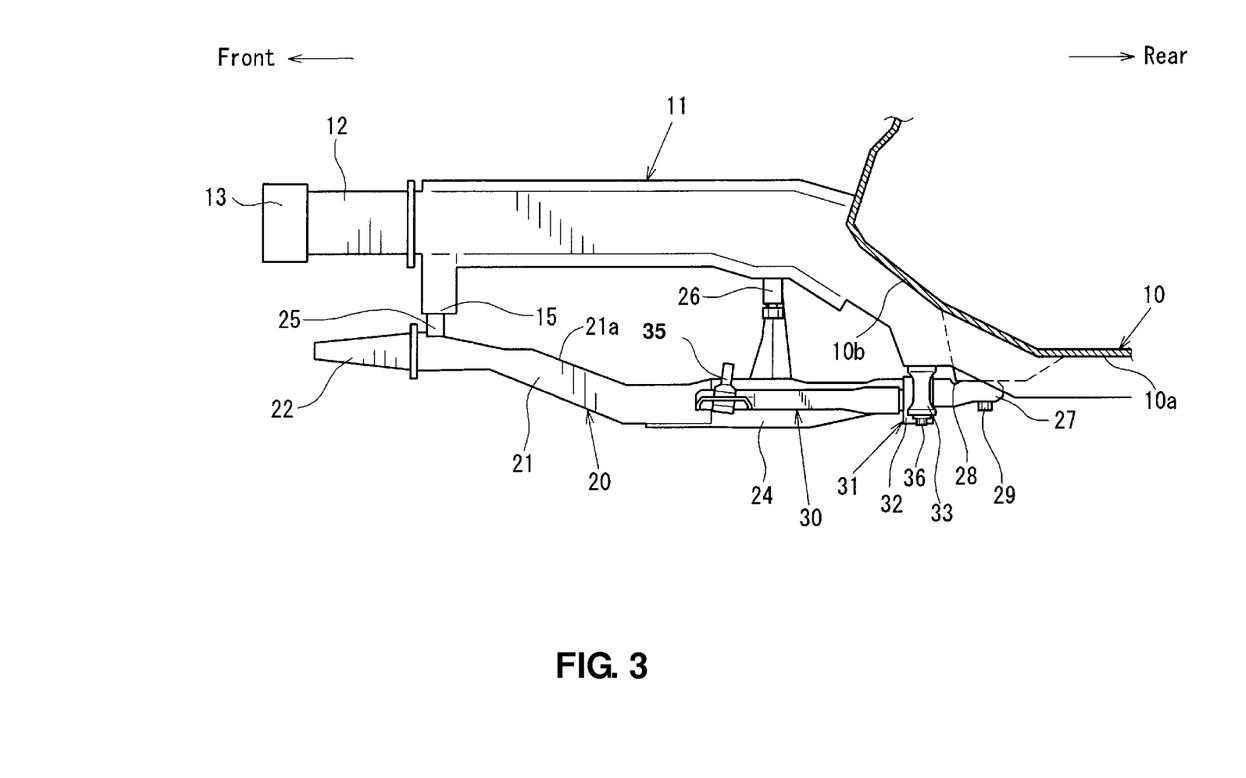
FIG. 3 is a left side view showing the lower vehicle-body structure of the front portion of the vehicle body.
Figure 4A:
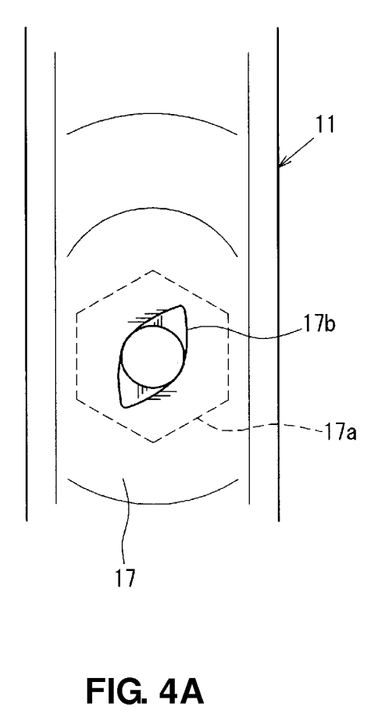
FIG. 4A, 4B are explanatory diagrams of a fourth connected portion.
Figure 4B:
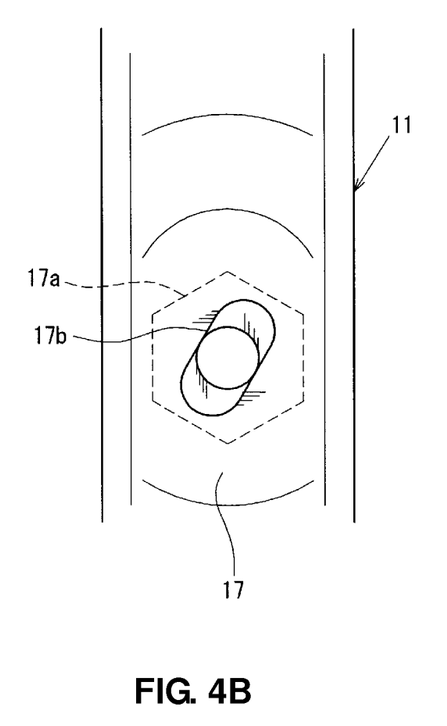
Figure 5:
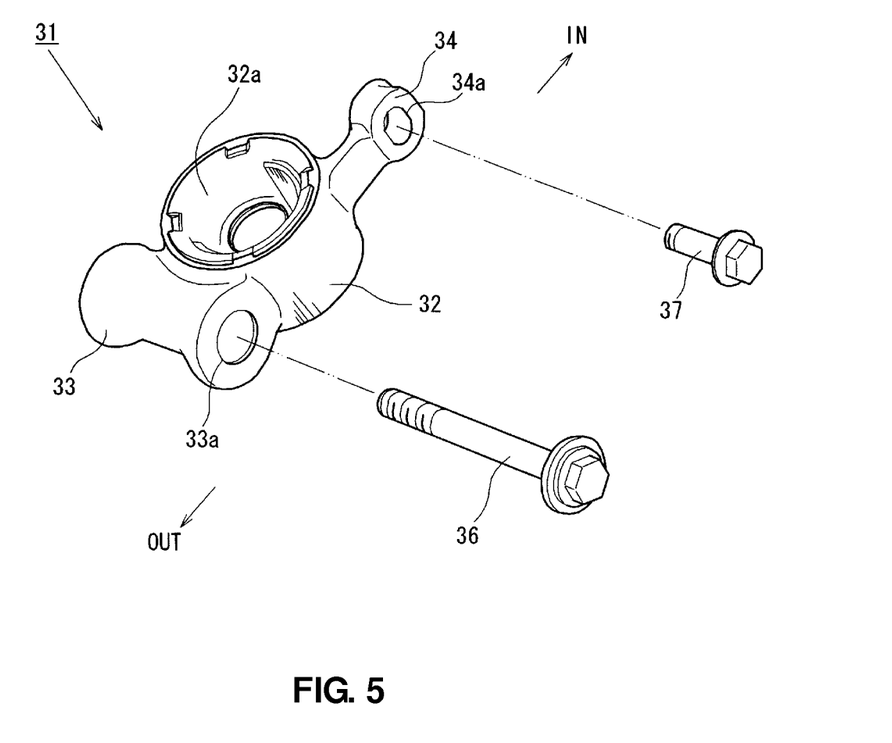
FIG. 5 is a perspective view of a rear connecting member, when viewed from its bottom face.

Hereinafter, a preferred embodiment of the present invention will be descried referring to the accompanying drawings. FIG. 1 is a perspective view showing a lower vehicle-body structure of a front portion of a vehicle body, when viewed from its bottom face. FIG. 2 is a bottom view showing the lower vehicle-body structure of the front portion of the vehicle body. FIG. 3 is a left side view showing the lower vehicle-body structure of the front portion of the vehicle body. FIG. 4A, 4B are explanatory diagrams of a fourth connected portion 17. FIG. 5 is a perspective view of a rear connecting member 31, when viewed from its bottom face. Herein, FIG. 4A illustrates a bolt through hole 17b (a separation promotion portion) of the present embodiment, and FIG. 4B illustrates another example of the bolt through hole 17b.

In the present specification, a front portion means a vehicle-forward portion, and a rear portion means a vehicle-rearward portion.

As shown in FIGS. 1, 2 and 3, a lower vehicle-body structure of a front portion of a vehicle body comprises a vehicle body 10, a pair of front side frames 11 which extends forward from the vehicle body 10 at both sides, upper crush cans 12 which are connected to front ends of the front side frames 11, a bumper reinforcement 13 which interconnects the both upper crush cans 12 in a vehicle width direction, a sub frame 20 which is connected below the front side frames 11, and a pair of lower arms 30 which is connected to the sub frame 20.

The vehicle body 10 forms a vehicle compartment partially in the present embodiment. An upper slant portion 10b which slants forward and upward from a front end of a substantially-horizontal bottom face 10a is formed at a front side portion of the vehicle body 10 as shown in FIG. 3.

Further, as shown in FIG. 1, at the front end of the bottom face 10a of the vehicle body 10 is provided a third connected portion 18 for connection of a third connection portion 27, which will be descried later. The third connected portion 18 is located at an inward position from and near the front side frames 11, which will be described later. A nut 18a for fixing the third connection portion 27 (see FIG. 7) is fixed to an inner face of the third connected portion 18.

The front side frame 11 is configured, as shown in FIGS. 1 and 3, so that it extends obliquely upward along the upper slant portion 10b from the front ends at the right and left portions of the bottom face 10a of the vehicle body 10 and extends further forward from an upper end of the upper slant portion 10b. Herein, the front side frame 11 is formed in a cylindrical member shape having a closed cross section.

At the bottom face 11a of the front side frame 11, as shown in FIG. 1, are provided a first connected portion 15 for connection of a first connection portion 25, which will be described later, of the sub frame 20 near the front portion, and a second connected portion 16 for connection of a second connection portion 26, which will be described later, of the sub frame 20 near the vehicle compartment 10. Further, at the rear portion of the front side frame 11 is provided a fourth connected portion 17 for connection of a fourth connection portion 33 near the front end of the bottom face 10a of the vehicle compartment 10.

Herein, the fourth connected portion 17 has a bolt through hole 17b having a lens-shaped cross section as shown in FIG. 4A. Further, the fourth connected portion 17 has a nut 17a for fixing the fourth connection portion 33, which is fixed to an inside face of the closed cross section of the fourth connected portion 17.

The upper crush can 12 is formed in a cylindrical-ember shape having a closed cross section which extends in the vehicle longitudinal direction, which is connected to the front portion of the front side frame 11 as shown in FIG. 1.

The bumper reinforcement 13 is configured in an arc shape having a trapezoid closed cross section, and interconnects the front ends of the both right-and-left upper crush cans 12 in the vehicle width direction, as shown in FIG. 1.

The sub frame 20, as shown in FIGS. 1 and 2, comprises a pair of longitudinal members 21, lower crush cans 22 which are connected to front ends of the longitudinal members 21, a front cross member 23 which interconnects both front portions of the longitudinal members 21 in the vehicle width direction, and a suspension cross member 24 which interconnects both rear ends of the longitudinal members 21 in the vehicle width direction.

As shown in FIG. 3, the sub frame 20 arranged below the front side frames 11 is fixed to the front side frames 11 via the first connection portion 25, the second connection portion 26, and the fourth connection portion 33, which will be described later. Further, the sub frame 20 is fixed to the vehicle body 10 via the third connection portion 27 which will be described later.

Herein, the sub frame 20 is rigidly fixed to the front side frames 11 and the vehicle body 10 without using any resilient member.

The longitudinal member 21, as shown in FIG. 1, is formed in the cylindrical member having the closed cross section which extends in the vehicle longitudinal direction, and arranged below the front side frames 11 as shown in FIGS. 2 and 3. Further, as shown in FIG. 3, the first connection portion 25 for connection of the first connected portion 15 of the front side frame 11 is provided at a front end of an upper face 21a of the longitudinal member 21.

The lower crush can 22 is of a truncated pyramid shape, and connected to the front end of the longitudinal member 21 as shown in FIG. 1. The front cross member 23, as shown in FIG. 1, has a reverse-recessed cross section and extends in the vehicle width direction in front of the longitudinal members 21.

The suspension cross member 24 interconnects the rear ends of the longitudinal members 21 in the vehicle width direction as shown in FIGS. 1 and 2. Further, as shown in FIGS. 1 and 3, at the front portion of the suspension cross member 24 is provided the second connection member 26 for connection of the second connected portion 16, while at the rear portion of the suspension cross member 24 is provided the third connection member 27 for connection of the third connected portion 18.

Moreover, as shown in FIG. 2, a fifth connected portion 24a for connection of a fifth connection portion 34 of the rear connecting member 31, which will be described later, is provided at a rear portion of the suspension cross member 24 which is located slightly in front of the third connection portion 27. Further, as shown in FIG. 3, a linear bead 28 extending in the vehicle width direction is formed at a specified position between the fourth connection portion 33 and the third connection portion 27 on an upper face of the suspension cross member 24.

The lower arm 30 curves and projects inwardly, having a bow shape, and has a support arm 30a which projects inward at its middle portion, as shown in FIGS. 1 and 2. This support arm 30a has at its tip a front connection portion 30b (see FIG. 2) which swingably supports the lower arm 30 at the front portion of the suspension cross member 24. A rear end of the lower arm 30 is swingably supported at both the fourth connected portion 17 and the fifth connected portion 24a via the rear connecting member 31. Herein, a ball joint 35 for connection of a knuckle arm (not illustrated) supporting a wheel is provided at a front end of the lower arm.

The rear connecting member 31, as shown in FIG. 5, comprises a support portion 32 to support the rear end of the lower arm 30, the fourth connection portion 33 which is positioned on the outward side of the support portion 32, and the fifth connection portion 34 which is positioned on the inward side of the support portion 32. Thus, the fifth connection portion 34, the support portion 32, and the fourth connection portion 33 are disposed in order from the inward side in the vehicle width direction.

The support portion 32 is formed in a cylindrical shape, having an opening in the vehicle longitudinal direction, and a rubber bush 32a is pressed into the inside of the support portion 32 so as to receive the rear end of the lower arm 30.

The fourth connection portion 33 is of a cylindrical shape having an axis extending vertically, and is formed on an outward peripheral face of the support portion 32. The fourth connection portion 33 has a bolt through hole 33a extending vertically at the center, which is fastened and fixed to the fourth connected portion 17 of the front side frame 11 with a bolt 36 (a fastening member).

The fifth connection portion 34 is formed in a flat-plate shape and extends inward from the peripheral face of the support portion 32, and has a bolt through hole 34a extending vertically at a central portion of its tip. Herein, the fifth connection portion 34 is fixed to the fifth connected portion 24a of the suspension cross member 24 with a bolt 37.

Hereinafter, a state of the front portion of the vehicle body having the lower vehicle-body structure described above in the vehicle frontal collision will be described referring to FIGS. 6 and 7.

Figure 6:
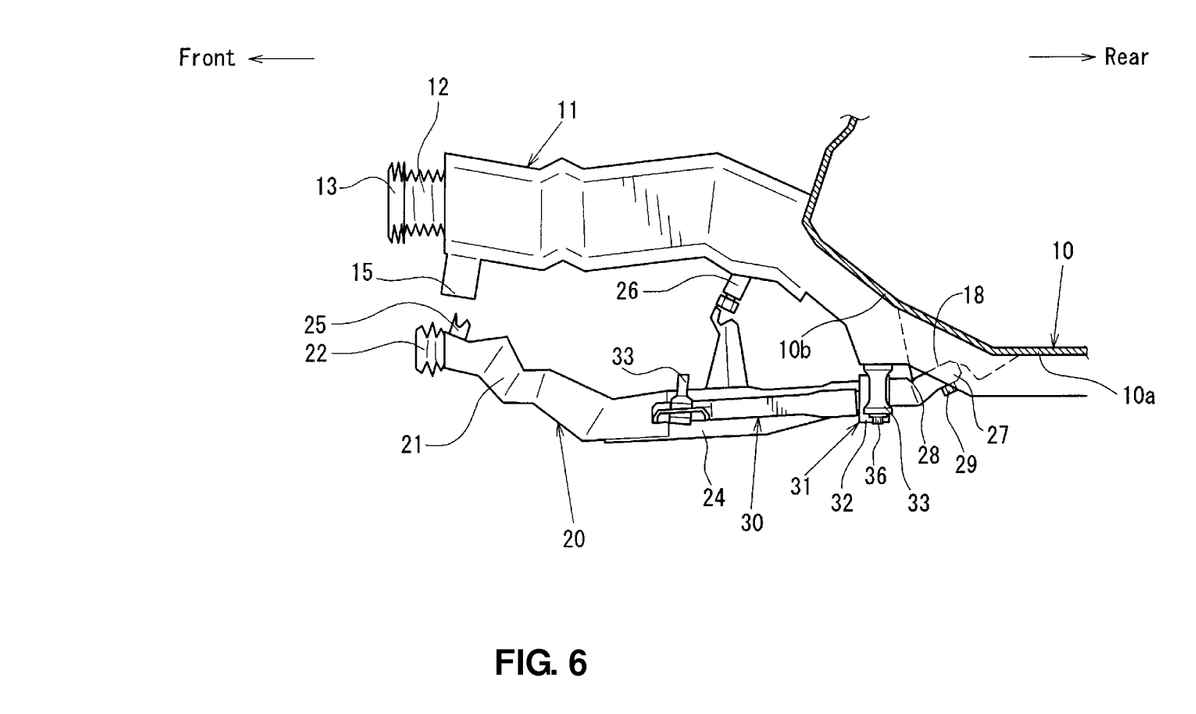
FIG. 6 is a left side view showing a state of the front portion of the vehicle body in an initial stage of a vehicle frontal collision.
Figure 7:
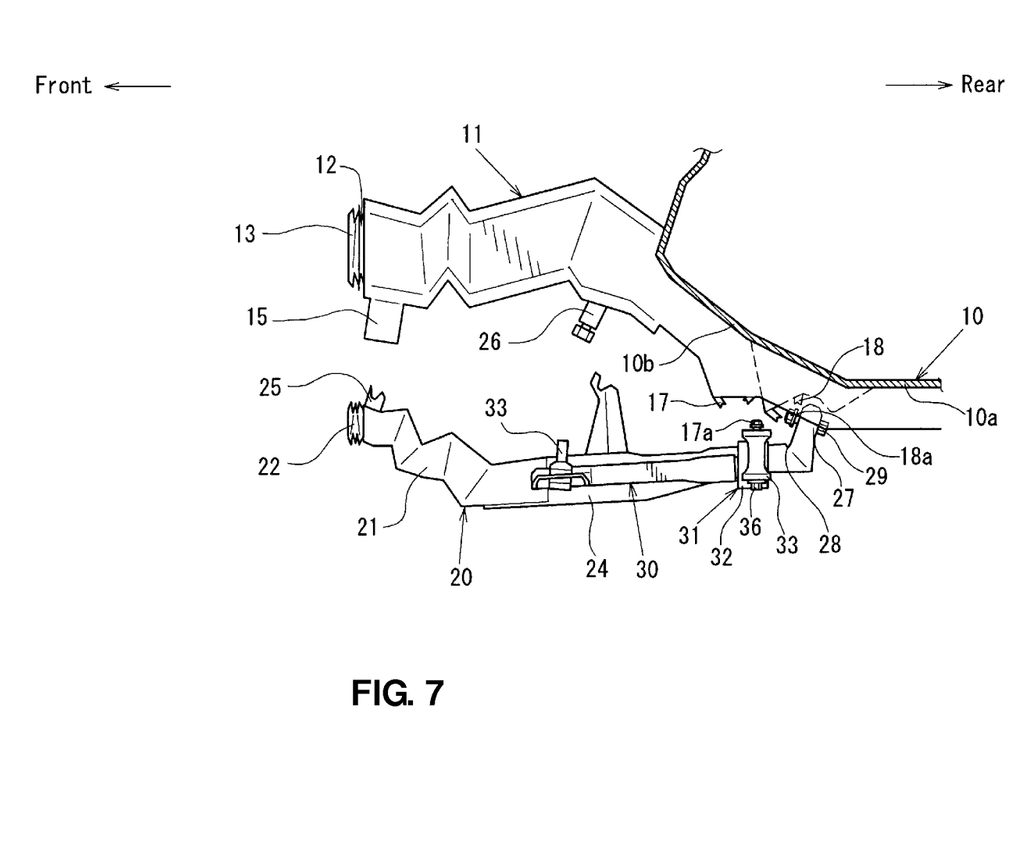
FIG. 7 is a left side view showing a state of the front portion of the vehicle body in a late stage of the vehicle frontal collision.

FIG. 6 shows the state of the front portion of the vehicle body in an initial stage of the vehicle frontal collision. FIG. 7 shows the state of the front portion of the vehicle body in a late stage of the vehicle frontal collision.

In the initial stage of the vehicle frontal collision, as shown in FIG. 6, the upper crush cans 12 and the lower crush cans 22 crush and deform, receiving the impact load from the vehicle front. Part of the collision impact is absorbed by the crushing of these crush cans 12, 22. The reduced collision impact is inputted from the front end of the front ends of the front side frames 11 and the front ends of the longitudinal members 21, then transmitted rearward.

The impact load from the vehicle front causes buckling deformations of the front side frames 11 and the longitudinal members 21 so that they bend in zigzag, respectively, and get away from each other both in the vertical direction and in the vehicle width direction. Herein, the front side frames 11 and the longitudinal members 21 have bead or portions having a relatively small cross section to form some weak portion, so that a manner of the buckling deformation can be controlled properly.

The above-described buckling deformations of the frost side frames 11 and the longitudinal members 21 cause some force to separate the first connection portion 25 and the second connection portion 26 off the front side frames 11, so that the first connection portion 25 and the second connection portion 26 are separated off the front side frames 11.

Moreover, part of the collision impact can be absorbed through the buckling deformation of the front side frames 11 and the longitudinal members 21.

The rest of collision impact which has not been absorbed through the buckling deformation of the front side frames 11 and the longitudinal members 21 is transmitted from the longitudinal members 21 to the suspension cross member 24. Herein, when the impact load from the vehicle front acts on the bead 28 formed at the suspension cross member 24, the suspension cross member 24 bends in a V shape at the bead 28 which is the relatively weak portion.

This bending of the suspension cross member 24 generates an upward rotational force around the bead 28 at a rear end of the suspension cross member 24. This rotational force makes the third connected portion 18 and its surrounding portion be pressed against the rear end of the suspension cross member 2 and then broken. After this, the rear end of the suspension cross member 24 becomes a support point of a leverage, and the impact load from the vehicle front which acts on the bead 28 causes a downward rotational force to act on the third connection portion 27.

The impact load from the vehicle front is further transmitted rearward, and then the downward rotational force acting on the third connection portion 27 causes some force to withdraw the third connection portion 27 together with a bolt 29 and a nut 18a from the third connected portion 18. Thereby, the third connected portion gets broken and the nut 18a is withdrawn. Accordingly, the third connection portion 27 of the sub frame 20 can be separated off the vehicle body 10.

Further, in the separation process of the third connection portion 27, the downward rotational force with the leverage's support point of the rear end of the suspension cross member 24 also acts on the rear connecting member 31 supporting the rear portion of the lower arm 30.

This downward force acts on both the fourth connection portion 33 and the fifth connection portion 34 of the rear connecting member 31. However, since the bolt through hole 17b of the fourth connected portion 17 is formed in the lens shape as described above, the fourth connected portion 17 becomes a weaker portion compared with the other portion for the downward force, so that the fourth connected portion 17 may be easily influenced by the downward force compared with the fifth connected portion 24a.

Accordingly, the downward force acts on the rear connecting member 31, and the force to withdraw the fourth connection portion 33 together with the bolt 36 and the nut 17a from the fourth connected portion 17 acts, so that the fourth connected portion 17 gets broken and the nut 17a is withdrawn, and finally the fourth connection portion 33 can be separated off the front side frames 11.

Accordingly, the sub frame 20 is separated along with the lower arms 30, so that the crush space to absorb the collision impact can be secured.

As described above, this lower vehicle-body structure of a vehicle comprises a pair of front side frames 11 extending in the longitudinal direction at both sides of the front portion of the vehicle body 10, the sub frame 20 arranged between the front side frames 11 and supporting the suspension member, a pair of lower arms 30 constituting part of the suspension member, the front connection portion 30b swingably supporting the front portion of the lower arm 30 at the sub frame 20, the rear connecting member 31 swingably supporting the rear portion of the lower arm 30 at the sub frame 20 and the front side frame 11, the rear connecting member 31 comprising the support portion 32 to support the lower arm 30, the fifth connection portion 34 to connect the fifth connected portion 24a of the sub frame 20 and the support portion 32, and the fourth connection portion 33 to connect the fourth connected portion 17 of the front side frame 11 and the support portion 32, and the separation mechanism to separate the fourth connection portion 33 off the front side frame 11 by the impact load from the vehicle front in the vehicle frontal collision. Accordingly, the sub frame 20 and the lower arm 30 are separated off the front side frame 11 by the separation mechanism in the vehicle frontal collision, so that the attachment rigidity of the support portion 32 at the lower arm 30 can be improved and the crush space to absorb the collision impact sufficiently in the vehicle frontal collision can be secured.

That is, connecting the lower arm 30 of the suspension to both the sub frame 20 and the front side frame 11 via the rear connecting member 31 can increase the attachment rigidity of the support portion 32 at the rear portion of the lower arm 30. Accordingly, the road noise which may generate during the vehicle traveling is reduced, so that the conformability of passengers can be improved.

Moreover, separating the sub frame 20 off the front side frame 11 together with the lower arm 30 in the vehicle frontal collision can secure the crush space at the front portion of the vehicle body. Accordingly, the collision impact in the vehicle frontal collision can be absorbed sufficiently.

Further, since the separation mechanism comprises the bolt through hole 17b (separation promotion portion) to assist the separation of the bolt 36 (fastening member) fastening the fourth connection portion 33 to the fourth connected portion 17 off the front side frame 11, the downward force to separate the sub frame 20 off the front side frame 11 acts on the bolt through hole 17b in the vehicle frontal collision, so that the fourth connection portion 33 can be easily separated off the front side frame 11.

Also, since the sub frame 20 comprises the suspension cross member 24 extending in the vehicle width direction and supporting the lower arms 30 and a pair of longitudinal members 21 extending in the longitudinal direction below the front side frames 11 and attached to the front portion of the suspension cross member 24, part of the collision impact in the vehicle frontal collision is absorbed through the buckling deformation of the longitudinal members 21, so that the collision impact which may be transmitted to the suspension cross member 24 can be reduced. Further, the suspension cross member 24 can be separated off the vehicle body 10 by the collision impact reduced by the buckling deformation of the longitudinal members 21. Accordingly, the crush space can be secured, and thereby the collision impact from the vehicle front can be absorbed sufficiently.

Moreover, since the rubber bush 32a resiliently supporting the lower arm 30 is provided at the support portion 32, even in case the sub frame 20 is rigidly fixed to the front side frame 11, the rubber bush 32a can reduce the road noise which may be transmitted via the lower arm 30. Accordingly, any resilient member, such as the rubber bush, may be eliminated in fixing the sub frame 20 to the front side frame 11, so that the number of parts or assembling steps may be decreased. Thereby, the costs reduction and weight reduction can be provided.

Further, the above-described separation mechanism constitutes a first separation mechanism, and a second separation mechanism is further provided, the second separation mechanism being configured to separate the third connection portion 27 which supports the rear end portion of the sub frame 20 at the vehicle body 10 off the vehicle body 10 in the vehicle frontal collision. Thereby, the rear end of the sub frame 20 is connected to the vehicle body 10, so that the support rigidity of the sub frame 20 can be improved and the sub frame 20 can be easily separated off the vehicle body 10 in the vehicle frontal collision.

Also, since the above-described second separation mechanism comprises the bead 28 provided between the fifth connected portion 24a of the sub frame 20 and the third connection portion 27, the buckling deformation of the sub frame 20 is promoted in the vehicle frontal collision, and the impact load from the vehicle front is transferred to the downward force through the bucking deformation, so that the third connection portion 27 can be separated off the vehicle body 10.

Further, the downward force to separate the sun frame 20 off the front side frame 11 is made act on the fourth connection portion 33 by the separation of the third connection portion 27, so that the fourth connection portion 33 can be separated off the front side frame 11. Accordingly, the buckling deformation of the sub frame 20 is caused, so that the impact load is transferred to the force to separate the sub frame 20, and the sub frame 20 can be easily separated.

The lower arm of the present invention corresponds to the lower arm 30 of the embodiment. Likewise, the front connecting member corresponds to the front connection portion 30b, the connected portion of the front side frame corresponds to the fourth connected portion 17, the connected portion of the sub frame corresponds to the fifth connected portion 24a, the first connection portion corresponds to the fifth connection portion 34, the second connection corresponds to the fourth connection portion 33, the slot-shaped opening portion corresponds to the bolt through hole 17b (separation promotion portion), the fastening member corresponds to the bolt 36, the resilient member corresponds to the rubber bush 32a, and the deformation promotion portion corresponds to the bead 28. The present invention should not be limited to the above-described embodiment, and any other modifications and improvements may be applied within the scope of a sprit of the present invention.

For example, the bolt through hole 17b (separation promotion portion) may be formed in another kind of shape illustrated in FIG. 4B, or a piece or something to break the fourth connected portion 17 may be further provided.

Further, while the weak portion is comprised of the bead 28, it may be formed by constituting an upper-face plate of the suspension cross member 24 which has a thinner thickness compared with its bottom-face plate.

What is claimed is:

1. A lower vehicle-body structure of a vehicle, comprising:
a pair of front side frames extending in a longitudinal direction at both sides of a front portion of a vehicle body;
a sub frame arranged between the front side frames and supporting a suspension member;
a pair of arm members constituting part of the suspension member;
a front connecting member swingably supporting a front portion of each arm member at the sub frame;
a rear connecting member swingably supporting a rear portion of each arm member at the sub frame and each front side frame, the rear connecting member comprising a support portion to support each arm member, a first connection portion to connect a connected portion of the sub frame and the support portion, and a second connection portion to connect a connected portion of each front side frame and the support portion; and
a separation mechanism to separate the second connection portion of the rear connecting member from each front side frame by an impact load from a vehicle front in a vehicle frontal collision.

2. The lower vehicle-body structure of a vehicle of claim 1, wherein the second connection portion of said rear connecting member is fastened to the connected portion of each front side frame via a fastening member, and said separation mechanism comprises a separation promotion portion to promote a downward separation of the fastening member from the connected portion of each front side frame by the impact load from the vehicle front in the vehicle frontal collision.

3. The lower vehicle-body structure of a vehicle of claim 2, wherein said separation promotion portion of the separation mechanism comprises a slot-shaped opening portion which is formed at the connected portion of each front side frame to assist the downward separation of said fastening member from the connected portion of each front side frame.

4. The lower vehicle-body structure of a vehicle of claim 3, wherein said separation mechanism constitutes a first separation mechanism, and a second separation mechanism is further provided, the second separation mechanism being configured to separate a third connection portion which supports a rear end portion of said sub frame and the vehicle body from the vehicle body by an impact load from the vehicle front in the vehicle frontal collision.

5. The lower vehicle-body structure of a vehicle of claim 4, wherein said second separation mechanism comprises a deformation promotion portion provided between the connected portion of said sub frame and said third connection portion.

6. The lower vehicle-body structure of a vehicle of claim 5, wherein said deformation promotion portion is a bead.

7. The lower vehicle-body structure of a vehicle of claim 2, wherein said separation mechanism constitutes a first separation mechanism, and a second separation mechanism is further provided, the second separation mechanism being configured to separate a third connection portion which supports a rear end portion of said sub frame and the vehicle body from the vehicle body by an impact load from the vehicle front in the vehicle frontal collision.

8. The lower vehicle-body structure of a vehicle of claim 7, wherein said second separation mechanism comprises a deformation promotion portion provided between the connected portion of said sub frame and said third connection portion.

9. The lower vehicle-body structure of a vehicle of claim 8, wherein said deformation promotion portion is a bead.

10. The lower vehicle-body structure of a vehicle of claim 1, wherein said sub frame comprises a suspension cross member extending in a vehicle width direction and supporting said pair of arm members and a pair of longitudinal members extending in the longitudinal direction below said pair of front side frames and attached to a front portion of the suspension cross member.

11. The lower vehicle-body structure of a vehicle of claim 1, wherein a resilient member resiliently supporting each arm member is provided at the support portion of said rear connecting member.

12. The lower vehicle-body structure of a vehicle of claim 1, wherein said separation mechanism constitutes a first separation mechanism, and a second separation mechanism is further provided, the second separation mechanism being configured to separate a third connection portion which supports a rear end portion of said sub frame and the vehicle body from the vehicle body by an impact load from the vehicle front in the vehicle frontal collision.

13. The lower vehicle-body structure of a vehicle of claim 12, wherein said second separation mechanism comprises a deformation promotion portion provided between the connected portion of said sub frame and said third connection portion.

14. The lower vehicle-body structure of a vehicle of claim 13, wherein said deformation promotion portion is a bead.

\* \* \* \* \*